United States Patent
Chou et al.

(10) Patent No.: US 10,924,485 B2
(45) Date of Patent: Feb. 16, 2021

(54) ELECTRONIC SIGNING AUTHORIZATION SYSTEM

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventors: Hsien-Ying Chou, Hsinchu (TW); Chun-Ming Chen, Hsinchu (TW); Tzu-Hsiang Lin, Zhubei (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 211 days.

(21) Appl. No.: 16/186,394

(22) Filed: Nov. 9, 2018

(65) Prior Publication Data
US 2020/0076808 A1   Mar. 5, 2020

(30) Foreign Application Priority Data
Aug. 31, 2018   (CN) .......................... 201811010710.7

(51) Int. Cl.
*H04L 29/06*   (2006.01)
*G06F 40/279*   (2020.01)
(Continued)

(52) U.S. Cl.
CPC ............ *H04L 63/10* (2013.01); *G06F 40/279* (2020.01); *G10L 17/00* (2013.01);
(Continued)

(58) Field of Classification Search
CPC ... H04L 63/10; H04L 63/0861; H04L 63/123; G06F 40/279; G10L 17/005; G06K 9/00087; G06K 9/00221; G06Q 10/103
(Continued)

(56) References Cited

U.S. PATENT DOCUMENTS 6,199,167 B1 * 3/2001 Heinrich ............ G06F 13/4027
380/255
6,603,464 B1 * 8/2003 Rabin ................... G06K 9/222
178/18.01

(Continued)

OTHER PUBLICATIONS

Alzahrani et al, Secure sign: Signing Document Online (Year: 2020).*

*Primary Examiner* — Shan E Elahi
(74) *Attorney, Agent, or Firm* — ScienBiziP, P.C.

(57) ABSTRACT

An electronic signing authorization method includes converting a signing request submitted by an end user into a predetermined format, verifying an identity of an authorizing user of an authorization layer according to a predetermined verification process, accepting input data of the authorizing user of the authorization layer when the identity of the authorizing user of the authorization layer is verified, and outputting an authorization command according to the input data when the input data includes authorization data. The predetermined format includes at least one of a text format, an audio format, or a video format. The authorization command corresponds to rejecting the signing request, not authorizing the signing request, or authorizing the signing request.

15 Claims, 8 Drawing Sheets

(51) Int. Cl.
 *G10L 17/00* (2013.01)
 *G06K 9/00* (2006.01)
(52) U.S. Cl.
 CPC ........ *H04L 63/0861* (2013.01); *H04L 63/123* (2013.01); *G06K 9/00087* (2013.01)
(58) Field of Classification Search
 USPC .......................................................... 726/3
 See application file for complete search history.

(56) References Cited

U.S. PATENT DOCUMENTS

| | | | | |
|---|---|---|---|---|
| 7,145,450 B2* | 12/2006 | Brown | ................... | B30B 9/3007 340/506 |
| 2003/0163739 A1* | 8/2003 | Armington | ............. | G10L 17/00 726/3 |
| 2004/0025030 A1* | 2/2004 | Corbett-Clark | ........ | G16H 10/60 713/186 |
| 2004/0107107 A1* | 6/2004 | Lenir | ....................... | G06F 21/32 704/270.1 |
| 2006/0277043 A1* | 12/2006 | Tomes | ..................... | G10L 17/04 704/247 |
| 2007/0192601 A1* | 8/2007 | Spain | .................... | H04L 9/3273 713/168 |
| 2012/0233046 A1* | 9/2012 | Joyce, Jr. | ............. | G06Q 10/087 705/35 |
| 2014/0181922 A1* | 6/2014 | Jakobsson | ................ | G06F 21/46 726/5 |
| 2015/0186365 A1* | 7/2015 | Pitzo | ........................ | G06F 16/22 707/608 |
| 2016/0062970 A1* | 3/2016 | Sadkin | .................. | G06F 40/103 715/233 |
| 2016/0063230 A1* | 3/2016 | Alten | ........................ | G06F 21/32 726/28 |
| 2018/0052990 A1* | 2/2018 | Jakobsson | .......... | G01B 9/02083 |
| 2018/0089407 A1* | 3/2018 | Watson | ................... | G10L 17/24 |
| 2018/0145833 A1* | 5/2018 | Lin | ........................... | H04L 9/30 |

* cited by examiner

ELECTRONIC SIGNING AUTHORIZATION SYSTEM

FIELD

The subject matter herein generally relates to an electronic signing authorization system, and more particularly to a system control method for implementing the electronic signing authorization system.

BACKGROUND

Generally, in electronic signing authorization systems, an end user submits a signing request to an authorizing user, and the authorizing user must authorize the signing request. The signing request may be required to be authorized by more than one authorizing user. The signing request is generally in a text format, which may restrict ease of submitting the signing request and may delay authorization of the signing request. Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
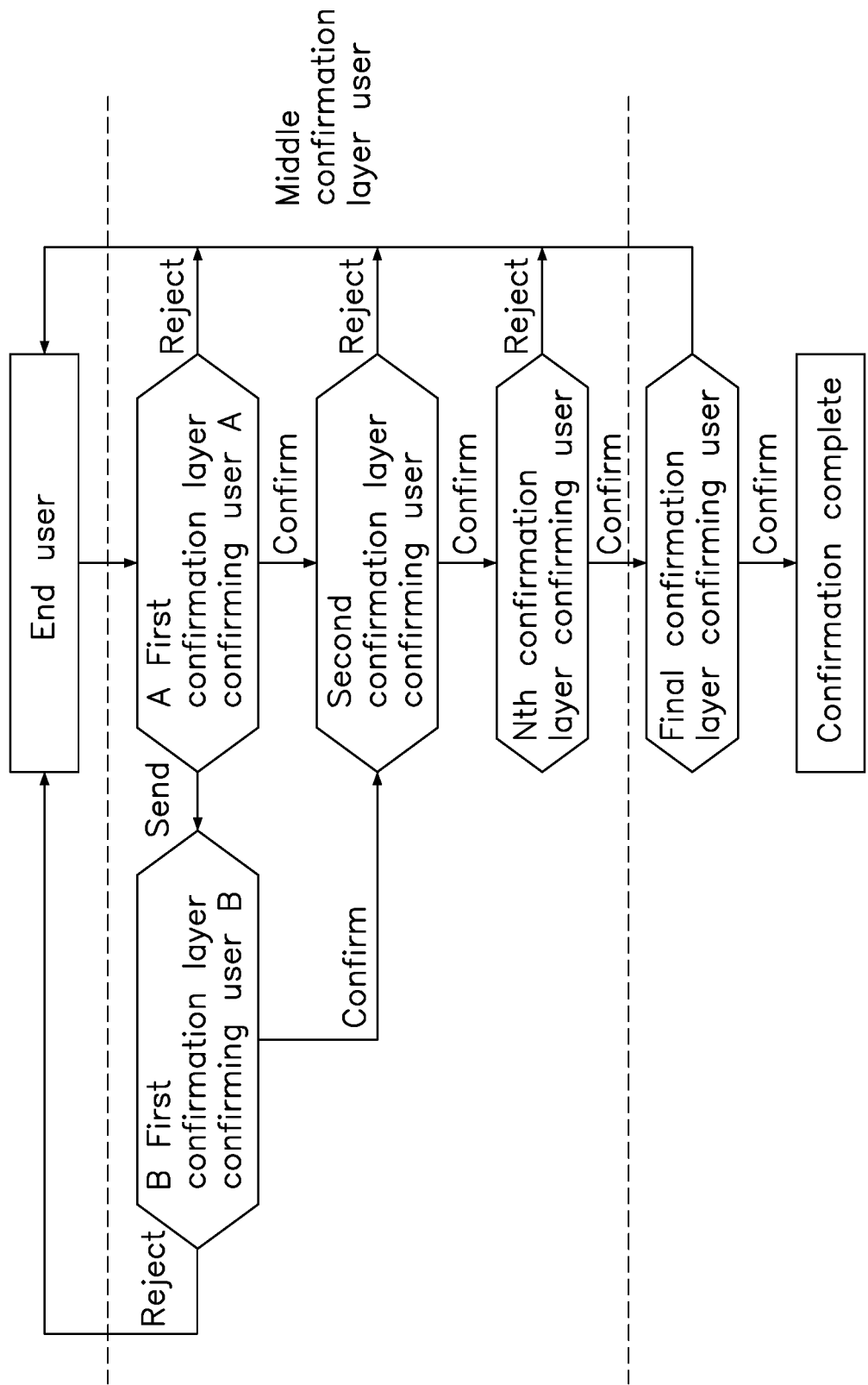
FIG. 1 is a diagram of a process for authorizing a signing request in accordance with an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of a process for authorizing a signing request. The process begins with an end user submitting a signing request. The signing request can be in a text form, an audio form, or a video form. The signing request is submitted to an authorization layer.

A middle authorization layer is an authorization layer between the end user and a final authorization layer. The middle authorization layer may include a first authorization layer, a second authorization layer, and so on up until an Nth authorization layer. The first authorization layer includes an authorization user A and an authorizing user B. The signing request may first be authorized by the authorization user A, and then the signing request is sent to the authorizing user B to be authorized.

The signing request may be converted into a predetermined format according to the authorization layer. The predetermined format is a format acceptable by the user of the authorization layer. The predetermined format may be a text format, an audio format, or a video format.

In the middle authorization layer, when an authorizing user authorizes the signing request, the signing request is sent to the authorizing user of the next authorizing layer.

In one embodiment, when the authorizing user of any of the authorizing layers (the middle authorizing layer or the final authorizing layer) rejects the signing request, the signing request is rejected back to the end user. When the authorizing user of the final authorization layer authorizes the signing request, the signing request is authorized.

It should be understood that when there is only one authorization layer, the authorization layer is defined as the final authorization layer.

Figure 2:
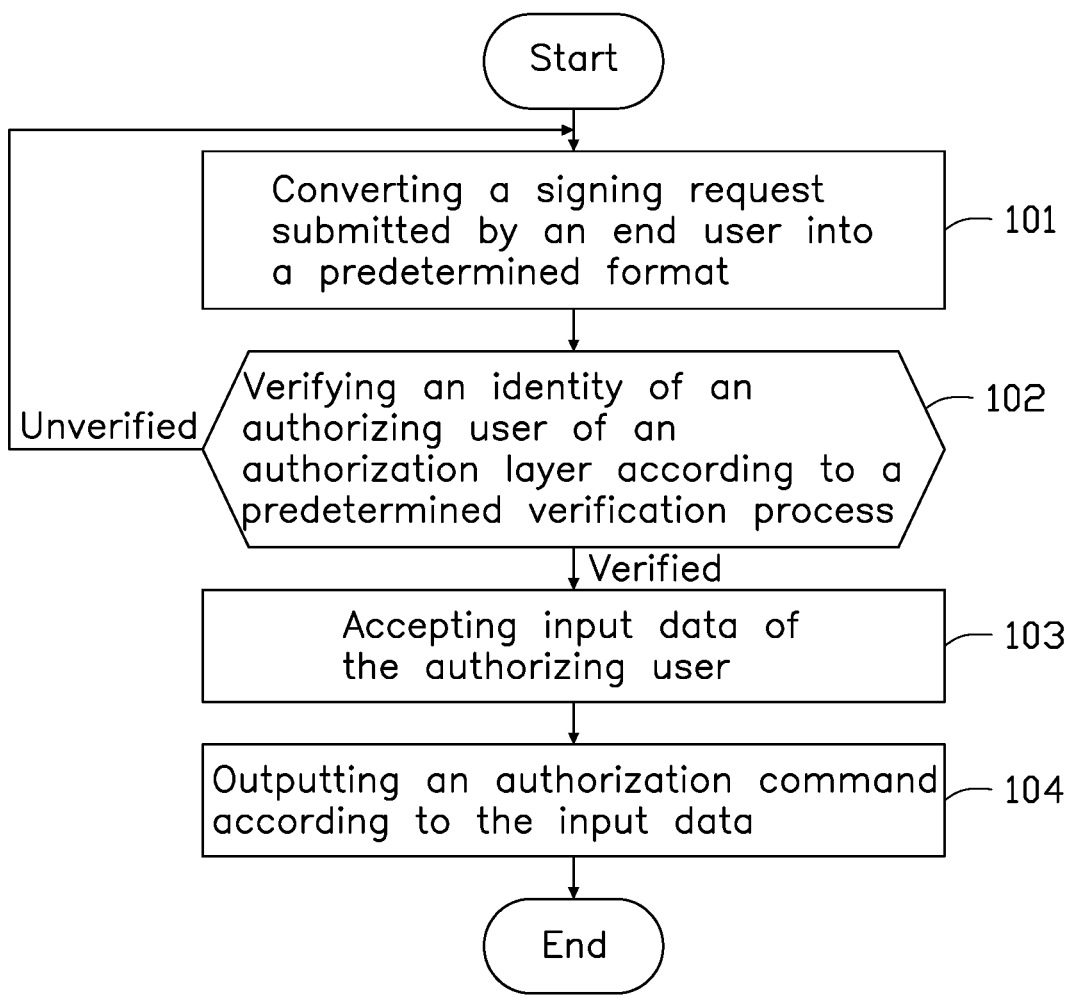
FIG. 2 is a flowchart of a first embodiment of an electronic signing authorization method.

FIG. 2 shows a flowchart of an exemplary electronic signing authorization method implemented in an electronic device. The example method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 101.

At block 101, a signing request submitted by an end user is converted into a predetermined format. The predetermined format includes at least one of a text format, an audio format, or a video format.

In one embodiment, the signing request includes information of any format required to be signed submitted by the end user.

In one embodiment, the predetermined format is determined according to a communication mode of a terminal device of the authorization layer. The communication mode may be a text communication mode, an audio communication mode, and/or a video communication mode.

When the communication mode is a text communication mode, the predetermined format of the signing request is the text format. When the communication mode is an audio communication mode, the predetermined format of the signing request is the audio format. When the communication mode is a video communication mode, the predetermined format of the signing request is the video format.

When the predetermined format of the signing request is the text format, the signing request is displayed as text on a display screen of the terminal device. When the predetermined format of the signing request is the audio format, the signing request is broadcasted by a speaker of the terminal device. When the predetermined format of the signing request is the video format, the signing request is displayed as video on a display screen of the terminal device.

The signing request may be input by the end user in a text format, an audio format, and/or a video format.

The format of the signing request input by the end user does not need to be the same as the predetermined format of the authorization layer. For example, if the predetermined format of the authorization layer is the audio format and the signing request is input as the text format, the terminal device of the authorizing user of the authorization layer converts the signing request into the audio format.

The signing request may further be converted into data of a predetermined format. The predetermined format may include document contents, signing contents, a name of the end user, a time of sending the signing request, or the like.

At block 102, an identity of the authorizing user of the authorization layer is verified according to a predetermined verification process.

In one embodiment, the predetermined verification process includes a password verification process, a fingerprint verification process, a voice recognition verification process, an iris verification process, and a facial recognition verification process.

It should be understood that the predetermined verification process may correspond to a classification level of the signing request for verifying the identity of the authorizing user, thereby enhancing security of authorizing the signing request.

It should be understood that any one of the authorization levels may include more than one authorizing user, such as the authorizing user A and the authorizing user B in FIG. 1.

When the identity of the authorizing user is verified, block 103 is implemented. Otherwise, when the identity of the authorizing user is not verified, block 101 is implemented or the method is ended.

At block 103, input data of the authorizing user of the authorization layer is accepted when the identity of the authorizing user of the authorization layer is verified.

In one embodiment, the input data is input according to the communication mode of the end terminal of the authorizing user. For example, if the communication mode of the end terminal is the text communication mode, the authorizing user may input the input data through a keyboard or a touchscreen of the end terminal. If the communication mode of the end terminal is the audio communication mode, the authorizing user may input the input data through a microphone of the end terminal. If the communication mode of the end terminal is the video communication mode, the authorizing user may input the input data through a camera of the end terminal.

At block 104, an authorization command according to the input data is output when the input data includes authorization data. The authorization command corresponds to rejecting the signing request, not authorizing the signing request, or authorizing the signing request.

In one embodiment, when the input data includes data in a text format, a text recognition engine is used to recognize keywords of the input data, and the authorization command is determined according to the keywords of the input data. When the input data includes data in an audio format, a speech recognition engine is used to recognize audio features of the input data, and the authorization command is determined according to the audio features of the input data. When the input data includes data in a video format, an image recognition engine is used to recognize image characteristics of the input data, and the authorization command is determined according to the image characteristics of the input data.

The authorization command is output to an electronic signing authorization system.

The signing request is converted into the predetermined format for the authorizing user of the corresponding authorization level, and the authorization command is determined according to the input data according to the communication mode of the end terminal used by the authorizing user. Thus, the authorizing user can timely authorize the signing request.

In another embodiment, block 102 may be combined with block 104, such that the identity of the authorizing user is verified when the input data includes the authorization data.

Figure 3:
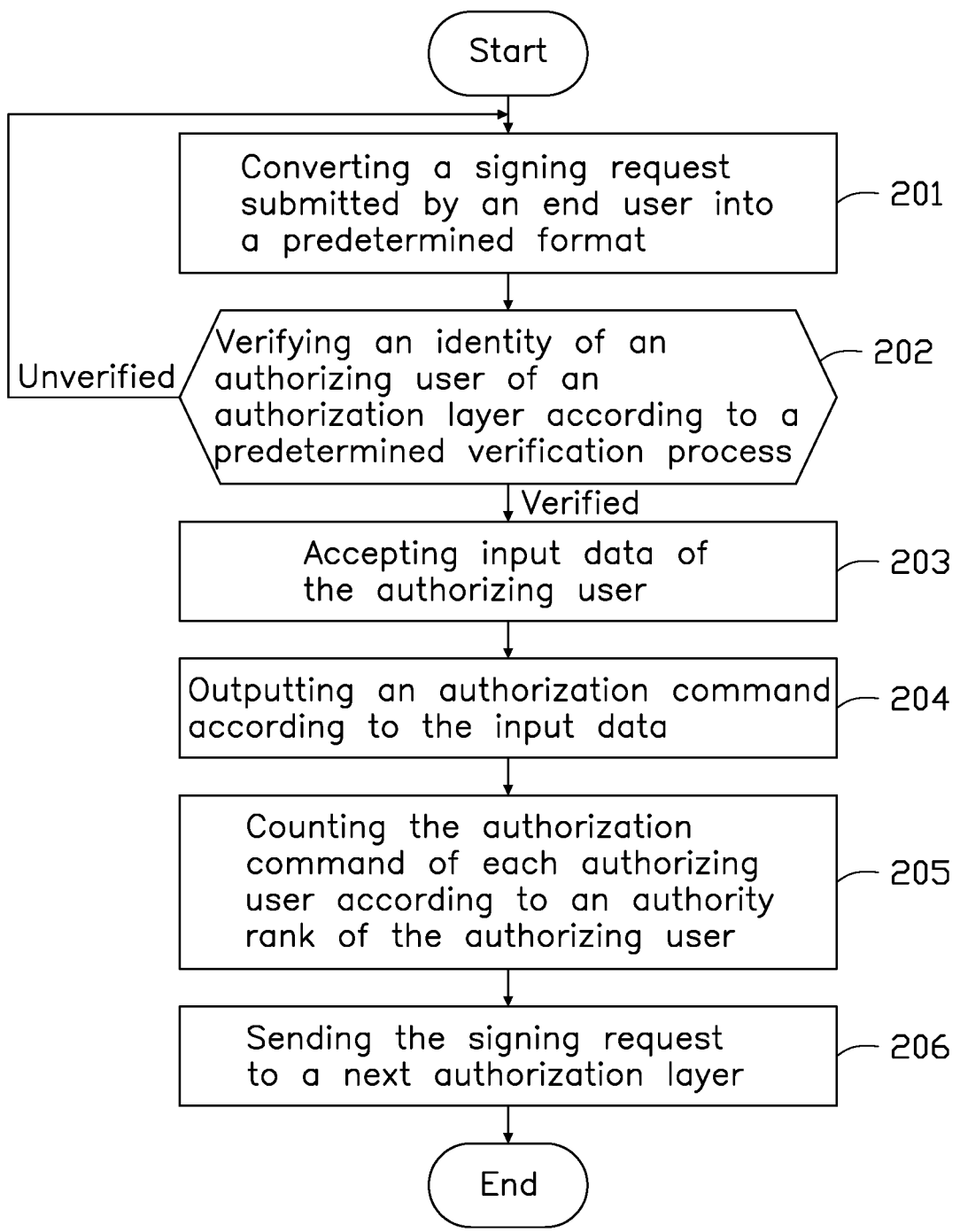
FIG. 3 is a flowchart of a second embodiment of an electronic signing authorization method.

FIG. 3 shows a flowchart of an exemplary electronic signing authorization method implemented in an electronic device. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 201.

At block 201, a signing request submitted by an end user is converted into a predetermined format. The predetermined format includes at least one of a text format, an audio format, or a video format.

At block 202, an identity of the authorizing user of the authorization layer is verified according to a predetermined verification process.

When the identity of the authorizing user is verified, block 203 is implemented. Otherwise, when the identity of the authorizing user is not verified, block 201 is repeated or the method is ended.

At block 203, input data of the authorizing user of the authorization layer is accepted when the identity of the authorizing user of the authorization layer is verified.

At block 204, an authorization command according to the input data is output when the input data includes authorization data. The authorization command corresponds to rejecting the signing request, not authorizing the signing request, or authorizing the signing request.

At block 205, when the authorization layer is a middle authorization layer including more than one authorizing user, the authorization command of each authorizing user is counted according to an authority rank of the authorizing user. The middle authorization layer is an authorization layer between the end user and the final authorization layer.

In one embodiment, the authority rank of the authorizing user corresponds to a weight of the authorization command. The higher the authority rank, the greater weight the authorization command. For example, if a first authorizing user of the middle authorization layer has an authority rank twice as great as the authority rank of a second authorizing user of the middle authorization layer, then the weight of the authorization command of the first authorizing user is twice as great as the authorization command of the second authorizing user.

At block 206, the signing request is sent to a next authorization layer when a weight of the authorization commands of the middle authorization layer corresponds to authorizing the signing request. When the weight of the authorization commands of the middle authorization layer corresponds to rejecting the signing request, then the signing request is rejected back to the end user.

Figure 4:
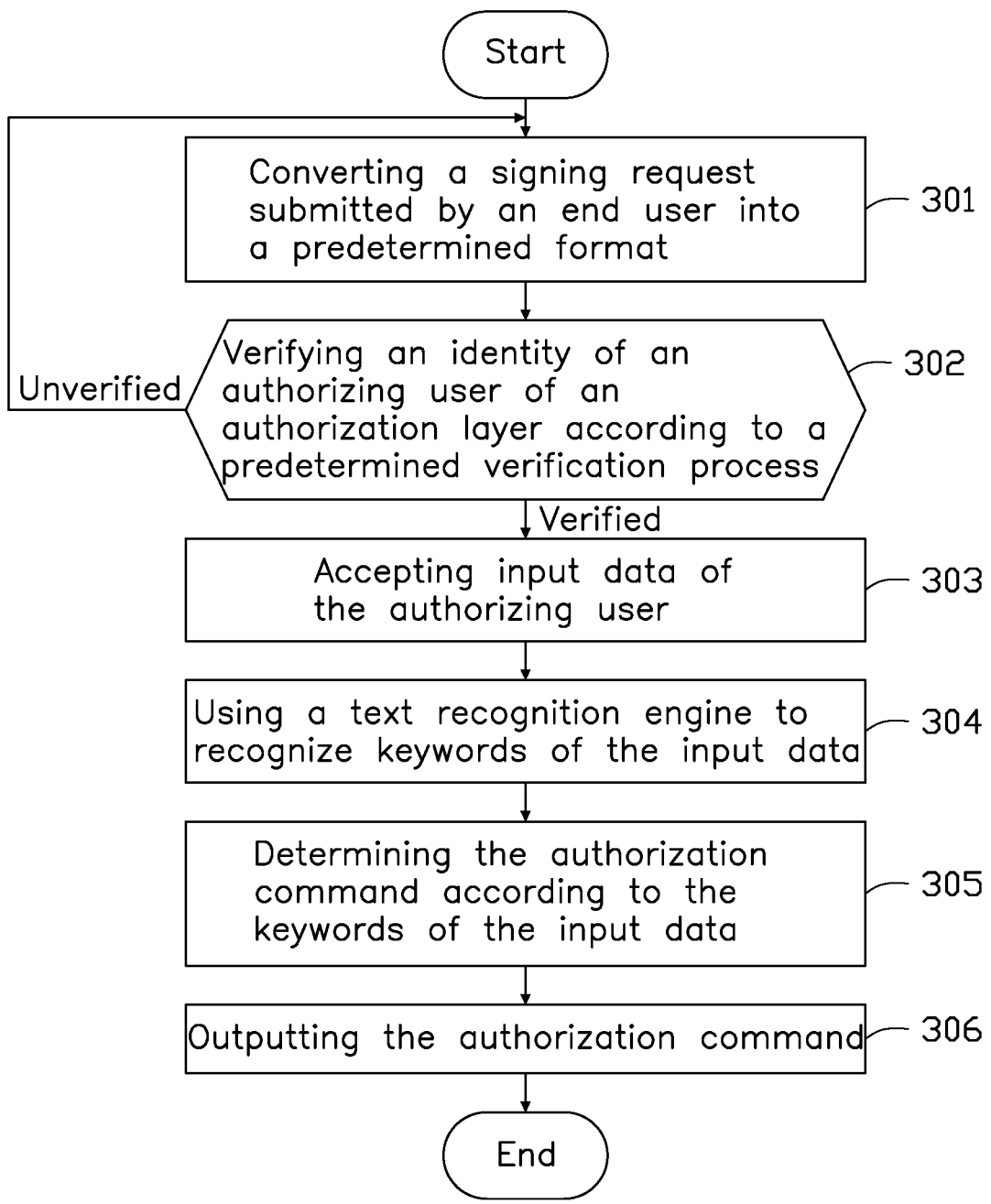
FIG. 4 is a flowchart of a third embodiment of an electronic signing authorization method.

FIG. 4 shows a flowchart of an exemplary electronic signing authorization method implemented in an electronic device. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 301.

At block 301, a signing request submitted by an end user is converted into a predetermined format. The predetermined format includes at least one of a text format, an audio format, or a video format.

At block 302, an identity of the authorizing user of the authorization layer is verified according to a predetermined verification process.

At block 303, input data of the authorizing user of the authorization layer is accepted when the identity of the authorizing user of the authorization layer is verified.

At block 304, if the input data is in the text format, a text recognition engine is used to recognize keywords of the input data.

At block 305, the authorization command is determined according to the keywords of the input data.

At block 306, the authorization command is output. The authorization command corresponds to rejecting the signing request, not authorizing the signing request, or authorizing the signing request.

It should be understood that at block 304, if the input data is in the audio format, a speech recognition engine is used to recognize audio features of the input data. Correspondingly, at block 305, the authorization command is determined according to the audio features of the input data.

It should be understood that at block 304, if the input data is in the video format, an image recognition engine is used to recognize image features of the input data. Correspondingly, at block 305, the authorization command is determined according to the image features of the input data.

Figure 5:
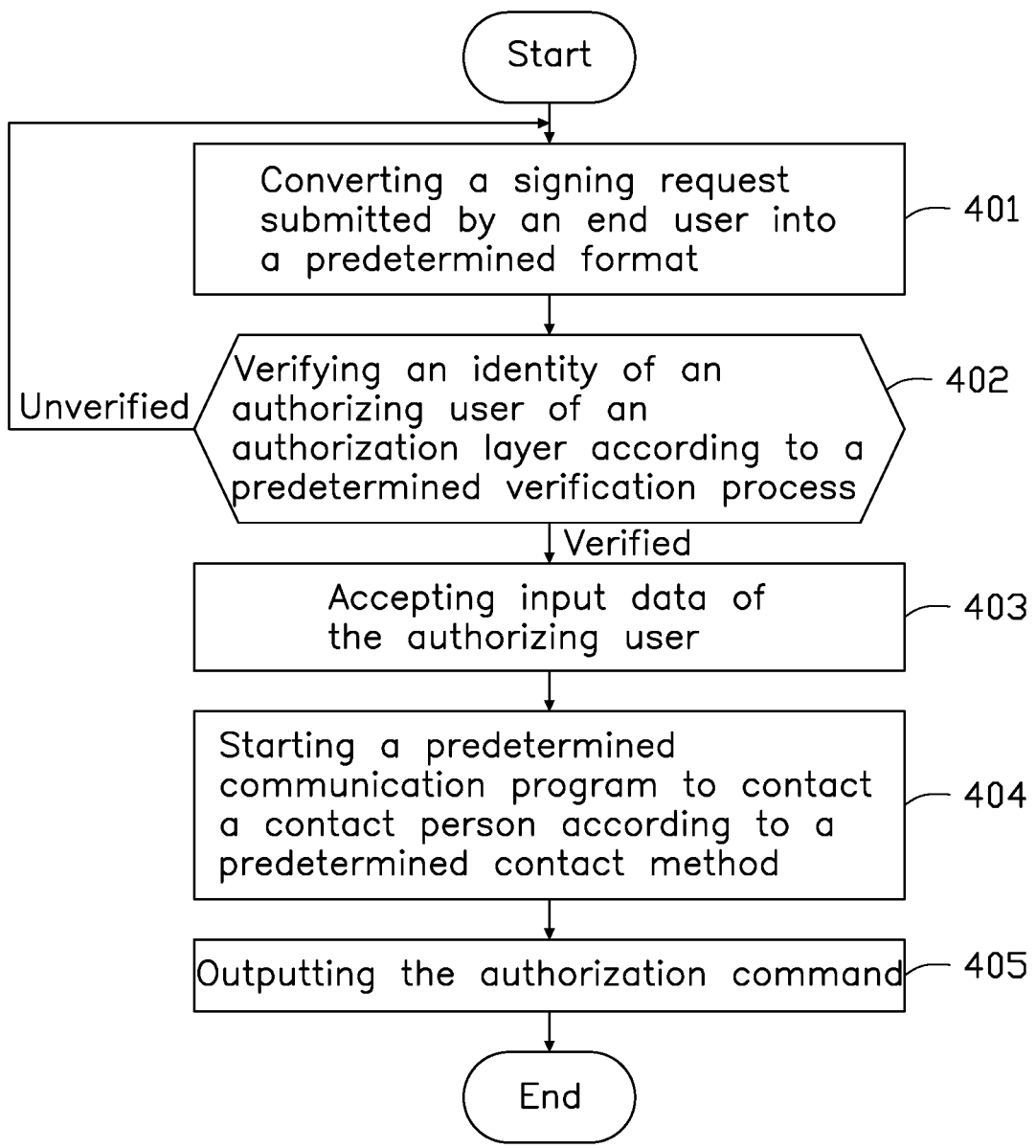
FIG. 5 is a flowchart of a fourth embodiment of an electronic signing authorization method.

FIG. 5 shows a flowchart of an exemplary electronic signing authorization method implemented in an electronic device. The example method is provided by way of example, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 401.

At block 401, a signing request submitted by an end user is converted into a predetermined format. The predetermined format includes at least one of a text format, an audio format, or a video format.

At block 402, an identity of the authorizing user of the authorization layer is verified according to a predetermined verification process.

At block 403, input data of the authorizing user of the authorization layer is accepted when the identity of the authorizing user of the authorization layer is verified.

At block 404, if the input data includes contact information of a contact person, a predetermined communication program is started to contact the contact person according to a predetermined contact method. The predetermined contact method includes a telephone, a text message, or an email.

In one embodiment, the contact person may be the end user, an authorizing user of the same authorization level, an authorizing user of a previous authorization level, an authorizing user of a next authorization level, or the like.

In one embodiment, the contact information of the contact person includes predetermined communication words, a name of the contact person, a phone number, and an email address.

The predetermined communication words may include "call the phone", "send an email", "send a text message", "contact", and the like. The name of the contact person may be the name of the authorizing user. The predetermined communication program may be a chat program installed in the terminal device.

At block 305, the authorization command is output. The authorization command corresponds to rejecting the signing request, not authorizing the signing request, or authorizing the signing request.

Figure 6:
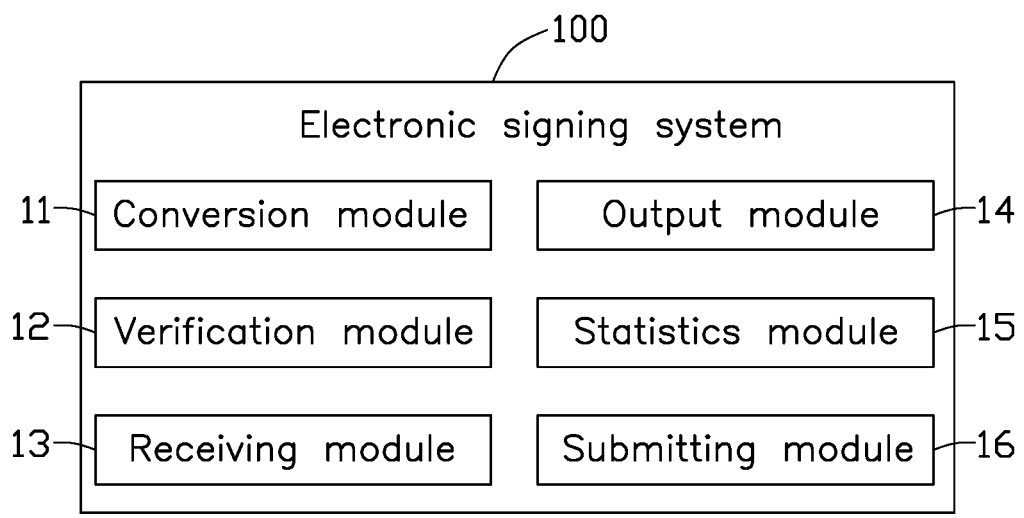
FIG. 6 is a block diagram of function modules of an electronic signing system.

FIG. 6 shows an embodiment of an electronic signing authorization system 100. The electronic signing authorization system 100 includes a plurality of modules, such as a conversion module 11, a verification module 12, a receiving module 13, an output module 14, a statistics module 15, and a submitting module 16.

Figure 7:
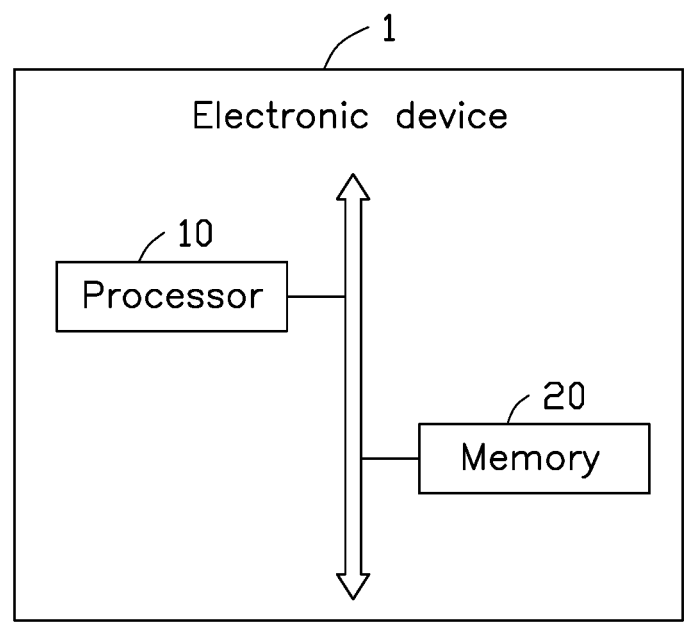
FIG. 7 is a block diagram of an electronic device.

FIG. 7 shows an embodiment of an electronic device 1. The electronic device 1 includes a processor 10 and a memory 20. The memory 20 stores the electronic signing authorization system 100, and the processor 10 executes functions of the modules of the electronic signing authorization system 100.

The electronic device 1 may be a desktop computer, a laptop computer, a cloud server, or other computing device.

The memory 20 may include, but is not limited to, a read-only memory, a random access memory, a programmable read-only memory, an erasable programmable read-only memory, a one-time programmable read-only memory, an electrically-erasable programmable read-only memory, an electrically-erasable programmable read-only memory, a compact disc read-only memory, or other optical storage disk, magnetic storage disc, or magnetic storage tape.

The processor 10 can be a central processing unit, a microprocessing unit, a digital signal processor, an application specific integrated circuit, a field-programmable gate array, or other data processing chip. In at least one embodiment, the storage device 20 can be a read-only memory, random access memory, or an external storage device such as a magnetic disk, a hard disk, a smart media card, a secure digital card, a flash card, or the like.

The conversion module 11 converts the signing request into the predetermined format. The predetermined format may be at least one of a text format, an audio format, or a video format.

The verification module 12 verifies the identity of the authorizing user.

The receiving module 13 receives the user input of the authorizing user after the identity of the authorizing user is verified.

The output module 14 outputs the authorization command according to the user input when the user input contains authorization data. The authorization command corresponds to rejecting the signing request, not authorizing the signing request, or authorizing the signing request.

The statistics module 15 counts the authorization commands according to a weight of the authorization commands when the authorization layer is a middle authorization layer including more than one authorizing user.

The submitting module 16 sends the signing request to the next authorization layer after the authorizing user authorizes the signing request.

Figure 8:
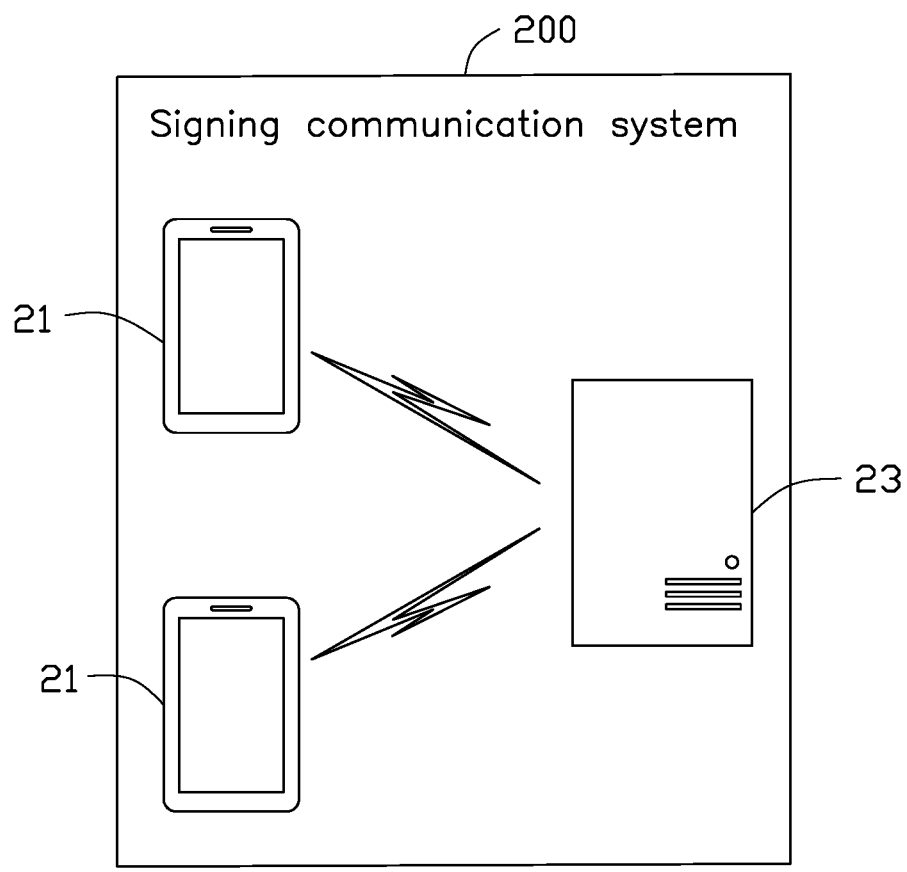
FIG. 8 is a block diagram of a signing authorization communication system.

FIG. 8 shows an embodiment of a signing authorization communication system 200 including a signing requesting terminal 21 and an authorizing terminal 22. The signing requesting terminal 21 and the authorizing terminal 22 are in communication with a server 23. The server 23 may be the electronic device 1 of FIG. 7. Thus, the electronic signing authorization system 100 may be implemented by the server 23. In other embodiments, the electronic signing authorization system 100 is implemented by the signature requesting terminal 21 and the authorizing terminal 22. The signing requesting terminal 21 is the end terminal used by the end user to send the signing request. The authorizing terminal 22 is the end terminal used by the authorizing user to send the authorization command. The end user sends the signing request to the server 23.

The server 23 receives the signing request and sends the signing request to the authorizing terminal 22. The authorizing terminal 22 provides the signing request to the authorizing user according to the predetermined communication mode of the authorizing terminal 22. The authorizing terminal 22 sends the user input including the authorization command to the server 23.

In other embodiments, the authorizing terminal 22 and the signature requesting terminal 21 are in direct communication with each other.

After the server 23 receives the user input including the authorization command to authorize the signing request, the server 23 sends the signing request to the authorizing terminal 22 of the next authorization level or completes the authorization of the signing request. If the server 23 receives the user input including the authorization command to reject the signing request, the server 23 sends the signing request back to the signature requesting terminal 21. If the server 23 receives the user input including the authorization command to not authorize the signing request, the server 23 does not take any action.

In another embodiment, the signature requesting terminal 21 and the authorizing terminal 22 may communicate directly with each other through BLUETOOTH, NFC, or other near-field communication technology.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic signing authorization method implemented in a terminal device, the electronic signing authorization method comprising:
    converting a signing request submitted by an end user into a predetermined format, the predetermined format comprising at least one of a text format, an audio format, or a video format;
    verifying an identity of an authorizing user of an authorization layer according to a predetermined verification process;
    accepting input data of the authorizing user of the authorization layer when the identity of the authorizing user of the authorization layer is verified;
    outputting an authorization command according to the input data when the input data comprises authorization data, the authorization command comprising rejecting the signing request, not authorizing the signing request, or authorizing the signing request;
    wherein the predetermined verification process comprises at least one of a password verification process, a fingerprint verification process, a voice recognition verification process, an iris verification process, and a facial recognition verification process; and
    wherein after accepting the input data of the authorizing user, the method further comprises:
    when the input data comprises data in a text format, using a text recognition engine to recognize keywords of the input data, and determining the authorization command according to the keywords of the input data;
    when the input data comprises data in an audio format, using a speech recognition engine to recognize audio features of the input data, and determining the authorization command according to the audio features of the input data;
    when the input data comprises data in a video format, using an image recognition engine to recognize image characteristics of the input data, and determining the authorization command according to the image characteristics of the input data.

2. The electronic signing authorization method of claim 1, wherein after accepting the input data of the authorizing user, the method further comprises:
    when the authorization layer is a middle authorization layer comprising more than one authorizing users, counting the authorization commands of each of the authorizing users;
    sending the signing request to a next authorization layer when the authorization commands of the middle authorization layer correspond to authorizing the signing request.

3. The electronic signing authorization method of claim 2, wherein the signing request is rejected back to the end user when the authorization commands of the middle authorization layer correspond to rejecting the signing request.

4. The electronic signing authorization method of claim 1, wherein after accepting the input data of the authorizing user, the method further comprises:
when the input data comprises contact information of a contact person, starting a predetermined communication program to contact the contact person according to a predetermined contact method, the predetermined contact method comprising a telephone call, a text message, or an email.

5. The electronic signing authorization method of claim 4, wherein the contact information of the contact person comprises predetermined communication words, a name of the contact person, a phone number, and an email address.

6. A terminal device comprising:
a processor; and
a memory storing a plurality of instructions, which when executed by the processor, cause the processor to:
convert a signing request submitted by an end user into a predetermined format, the predetermined format comprising at least one of a text format, an audio format, or a video format;
verify an identity of an authorizing user of an authorization layer according to a predetermined verification process;
accept input data of the authorizing user of the authorization layer when the identity of the authorizing user of the authorization layer is verified;
output an authorization command according to the input data when the input data comprises authorization data, the authorization command comprising rejecting the signing request, not authorizing the signing request, or authorizing the signing request wherein the predetermined verification process comprises a password verification process, a fingerprint verification process, a voice recognition verification process, an iris verification process, and a facial recognition verification process; and
wherein after accepting the input data of the authorizing user, the processor is further caused to:
when the input data comprises data in a text format, using a text recognition engine to recognize keywords of the input data, and determining the authorization command according to the keywords of the input data;
when the input data comprises data in an audio format, using a speech recognition engine to recognize audio features of the input data, and determining the authorization command according to the audio features of the input data;
when the input data comprises data in a video format, using an image recognition engine to recognize image characteristics of the input data, and determining the authorization command according to the image characteristics of the input data.

7. The electronic device of claim 6, wherein after accepting the input data of the authorizing user, the processor is further caused to:
when the authorization layer is a middle authorization layer comprising more than one authorizing users, counting the authorization commands of each of the authorizing users;
sending the signing request to a next authorization layer when the authorization commands of the middle authorization layer correspond to authorizing the signing request.

8. The electronic device of claim 7, wherein the signing request is rejected back to the end user when the authorization commands of the middle authorization layer correspond to rejecting the signing request.

9. The electronic device of claim 6, wherein after accepting the input data of the authorizing user, the processor is further caused to:
when the input data comprises contact information of a contact person, starting a predetermined communication program to contact the contact person according to a predetermined contact method, the predetermined contact method comprising a telephone call, a text message, or an email.

10. The electronic device of claim 9, wherein the contact information of the contact person comprises predetermined communication words, a name of the contact person, a phone number, and an email address.

11. A non-transitory storage medium having stored thereon instructions that, when executed by at least one processor of a terminal device, causes the at least one processor to execute instructions of an electronic signing authorization method, the electronic signing authorization method comprising:
converting a signing request submitted by an end user into a predetermined format, the predetermined format comprising at least one of a text format, an audio format, or a video format;
verifying an identity of an authorizing user of an authorization layer according to a predetermined verification process;
accepting input data of the authorizing user of the authorization layer when the identity of the authorizing user of the authorization layer is verified;
outputting an authorization command according to the input data when the input data comprises authorization data, the authorization command comprising rejecting the signing request, not authorizing the signing request, or authorizing the signing request;
wherein after accepting the input data of the authorizing user, the method further comprises:
when the input data comprises data in a text format, using a text recognition engine to recognize keywords of the input data, and determining the authorization command according to the keywords of the input data;
when the input data comprises data in an audio format, using a speech recognition engine to recognize audio features of the input data, and determining the authorization command according to the audio features of the input data;
when the input data comprises data in a video format, using an image recognition engine to recognize image characteristics of the input data, and determining the authorization command according to the image characteristics of the input data.

12. The non-transitory storage medium of claim 11, wherein after accepting the input data of the authorizing user, the method further comprises:
when the authorization layer is a middle authorization layer comprising more than one authorizing users, counting the authorization commands of each of the authorizing users;
sending the signing request to a next authorization layer when the authorization commands of the middle authorization layer correspond to authorizing the signing request.

13. The non-transitory storage medium of claim 12, wherein the signing request is rejected back to the end user when the authorization commands of the middle authorization layer correspond to rejecting the signing request.

14. The non-transitory storage medium of claim 11, wherein after accepting the input data of the authorizing user, the method further comprises:
   when the input data comprises contact information of a contact person, starting a predetermined communication program to contact the contact person according to a predetermined contact method, the predetermined contact method comprising a telephone call, a text message, or an email.

15. The non-transitory storage medium of claim 14, wherein the contact information of the contact person comprises predetermined communication words, a name of the contact person, a phone number, and an email address.

* * * * *